United States Patent [19]

Robinson

[11] Patent Number: 4,624,843
[45] Date of Patent: Nov. 25, 1986

[54] RECOVERY OF CHLORINE

[75] Inventor: Michael Robinson, Wooton, England

[73] Assignee: SCM Chemicals Limited, London, England

[21] Appl. No.: 743,055

[22] Filed: Jun. 10, 1985

[30] Foreign Application Priority Data

Jun. 13, 1984 [GB] United Kingdom ............... 8415034

[51] Int. Cl.$^4$ ............................................. C01G 49/10
[52] U.S. Cl. ................................. 423/493; 423/148; 423/463; 423/492; 423/500; 423/610; 423/632; 423/633
[58] Field of Search ............... 423/493, 492, 148, 149, 423/147, 138, 463, 500, 610, 633, 632

[56] References Cited

U.S. PATENT DOCUMENTS

| | | | |
|---|---|---|---|
| 3,865,920 | 2/1975 | Dunn, Jr. ............................. | 423/493 |
| 3,950,489 | 4/1976 | Fukushima ........................... | 423/148 |
| 4,060,584 | 11/1977 | Hartmann et al. .................. | 423/149 |
| 4,083,923 | 4/1978 | Lippman et al. .................... | 423/493 |
| 4,094,954 | 6/1978 | Bonsack et al. ..................... | 423/149 |
| 4,179,489 | 12/1979 | Lumsden ............................. | 423/148 |
| 4,183,899 | 1/1980 | Bonsack .............................. | 423/493 |
| 4,244,929 | 1/1981 | Lumsden et al. .................... | 423/493 |
| 4,259,298 | 3/1981 | Turner et al. ....................... | 423/493 |
| 4,363,789 | 12/1982 | Dunn, Jr. ............................. | 423/149 |
| 4,389,391 | 6/1983 | Dunn, Jr. ............................. | 423/149 |
| 4,563,338 | 1/1986 | Séon et al. .......................... | 423/149 |
| 4,576,636 | 3/1986 | Robinson et al. ................... | 423/149 |

Primary Examiner—Andrew H. Metz
Assistant Examiner—Anthony McFarlane
Attorney, Agent, or Firm—R. A. Sturges; T. M. Schmitz

[57] ABSTRACT

Chlorine may be recovered from residues from the fluidized bed chlorination of iron-containing metalliferous oxidic materials, such as ilmenite, bauxite, chromite, wolframite, scheelite, tantalite or columbite, the residues containing condensed iron chloride and blow-over bed solids, by heating the residue to revolatalize the iron chloride and reacting it with oxygen. The quantity of iron chloride in the oxidic material is controlled relative to the quantity of blow-over carbon so that the quantity of carbon is sufficient on combustion to provide the required heat but is insufficient to cause undue dilution of the chlorine produced by virtue of its combustion products. Chlorine of a concentration suitable for direct recycle to a chlorination process, e.g. of 30% to 50% volume concentration is produced.

20 Claims, 1 Drawing Figure

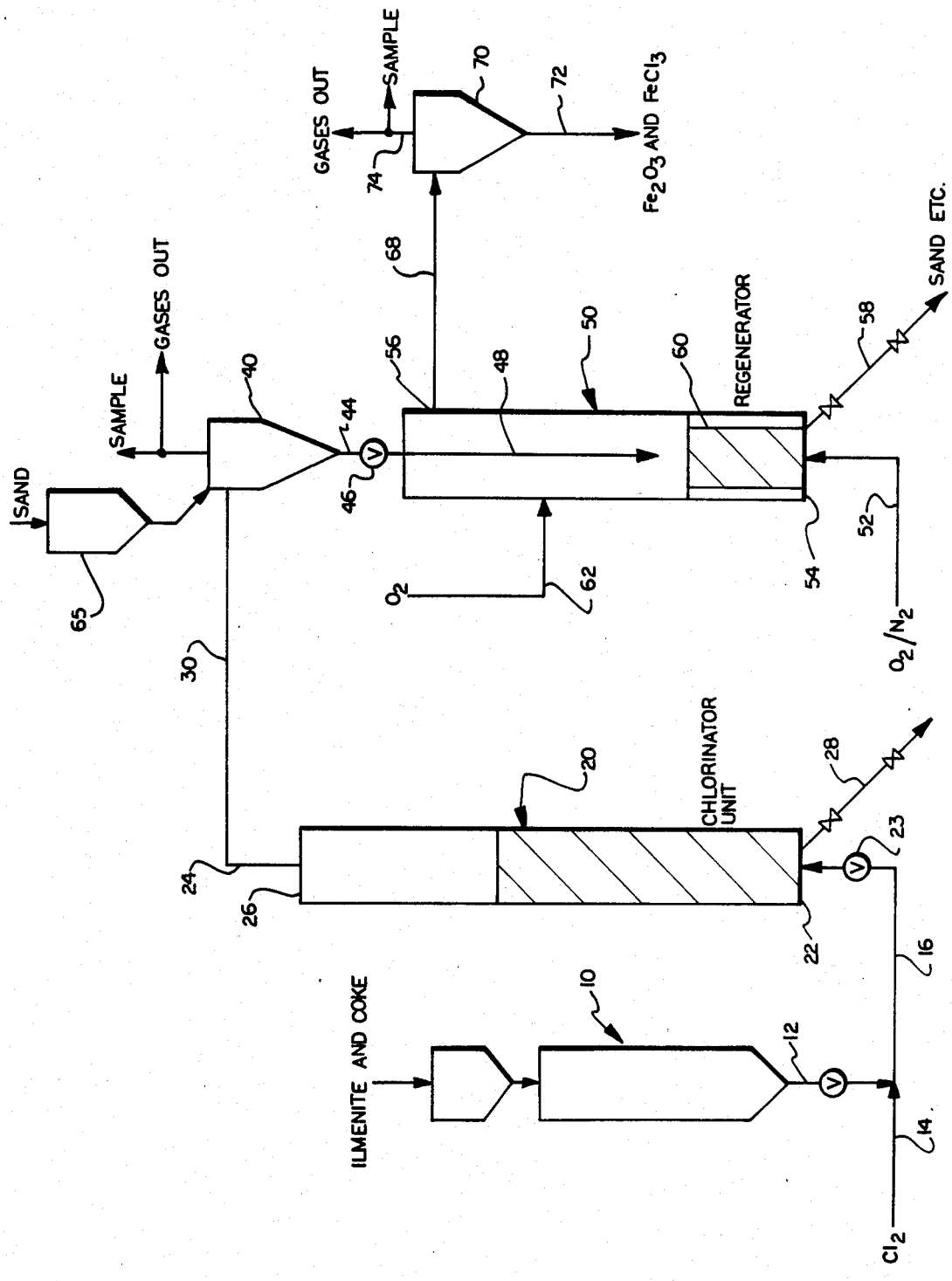

RECOVERY OF CHLORINE

Priority is claimed from United Kingdom application No. 8415034, filed June 13, 1984.

This invention relates to the recovery of chlorine from oxidizable metal chlorides.

Metal values may be recovered from iron-containing metalliferous oxidic materials by chlorination processes. Such processes may involve the selective chlorination of the iron values in the material and the removal of iron chloride from the metal oxide-containing residue, generally referred to as beneficiation or 'partial chlorination' processes, or the chlorination of both the iron values and the metal values in the material and the subsequent separation of iron chloride from the metal chloride so produced, generally referred to as 'total' chlorination processes. In either type of process it is desirable to recover chlorine for recycle from the possibly substantial quantity of iron chloride, usually also accompanied by chlorides of other minor constitutents, or even a proportion of the chloride of the major metal constitutent other than iron, of the oxidic material. Hereafter reference to iron chloride includes a reference to other chlorides accompanying it unless the context requires otherwise.

One process of the recovery of chlorine in a directly recyclable form is described in the Journal of Metals Vol 27 No 11, 1975 pages 12 to 16. In the referenced paper, there is described the dechlorination of solid iron chloride by vaporizing it and introducing it into contact with preheated oxygen in an externally heated bed of iron oxide particles. Extremely high concentration chlorine is obtainable by this means but at very considerable energy costs.

A further process for the recovery of chlorine from iron chloride produced by means of a selective or 'partial' ore chlorination process is described in U.S. Pat. No. 4094954 of SCM Corp. In that process the iron oxide content of a titaniferous ore, for example Australian Ilmenite having the composition of 54% $TiO_2$ and 30% total iron oxides calculated as the metal, is chlorinated in the presence of petroleum coke and the vaporous stream containing the iron chloride in the vapor form is contacted with pure oxygen to obtain iron oxide and chlorine gas which is discharged from the system. Since this gas contains the combustion products of the coke used in the ore chlorination it cannot be at a concentration suitable for direct recycle to the chlorination reaction for which purpose a separate feed of chlorine is used.

Yet a further process for the recovery of chlorine from iron chloride which may have been produced as a by-product stream from an ilmenite chlorination process for manufacturing titanium dioxide such a stream typically having the composition:

| | |
|---|---|
| $FeCl_3$ | 87% wt |
| $FeCl_2$ | 5% wt |
| $TiCl_4$ | 3% wt |
| $AlCl_3$ | 2% wt |
| $MnCl_3$ | 2% wt |
| $MgCl_2$ | 0.6% wt |
| Miscellaneous | 0.4% wt |
| Total | 100.0% | described in U.S. Pat. Nos. 4174381 and 4282185 of DuPont. According to that process a multistage recirculating fluidized bed reactor giving initial dense and downstream dilute fluidized zones and having specified dimenions is employed. The bed materials comprise recirculated iron oxide, sodium chloride as a catalyst and a carbonaceous fuel which is added to provide combustion heat to vaporize the iron chloride which is thereby enabled to react with an excess of oxygen added to the reactor. In this process the carbonaceous fuel is preferably a dry pulverized lignite char and represents an appreciable process cost.

The present invention provides a process comprising the fluidized bed chlorination of an iron-containing metalliferous oxidic material by means of a chlorine-containing gas in the presence of an excess of carbon, to chlorinate at least a portion of the iron values in the material and to combust a portion of the carbon, removing from the fluidized bed an effluent stream containing vaporous iron chloride and combustion gases, condensing the iron chloride to the solid, removing the condensed iron chloride from the effluent stream and from the combustion gases therein, revaporizing the iron chloride and contacting it at a suitable elevated temperature with oxygen to regenerate chlorine gas therefrom, wherein the effluent stream also contains blow-over carbon in a predetermined quantity which carbon is removed from the effluent stream with the condensed iron chloride, and in that the quantity of iron chloride formed by the chlorination is controlled by reference to the quantity of condensed iron chloride which may be heated by the combustion of the said quantity of carbon to said suitable elevated temperature and which will react with oxygen to produce chlorine, for example, having a concentration of from 30% to 50% suitable for direct recycle to the chlorination.

This invention has the advantage of requiring no additional source of heat for the regeneration of chlorine from the iron chloride and the direct production of chlorine of recycle concentration and requires process control to achieve in a manner not previously taught.

The fluidized bed chlorination of iron-containing metalliferous oxidic materials, such as suitable ores, refined ores, sands, slags or industrial by-products, or mixtures of one or more of the above, in the presence of excess carbon is well known. The function of the carbon is to combine with the oxygen content of the iron or metal oxides to be chlorinated and, to provide reaction heat as a result of the combustion process. If the carbon is not in excess there will be a tendency for reoxidation of the chlorides formed. Additionally, there are a number of "partial" chlorination processes which obtain selectivity of chlorination by the use of diluted chorine, the use of carbon in excess removing of carbon as a process controlling factor.

The present process is illustrated hereafter by reference to the chlorination of oxidic iron-containing titaniferous materials, but is equally applicable to the chlorination of other iron-containing oxidic materials, since the critical feature relevant to the operation of the invention is the quantity of iron chloride produced. Thus, in one particular embodiment, the invention may be utilized in relation to the "total" chlorination of an oxidic iron-containing titaniferous material to produce an effluent stream containing titanium tetrachloride in addition to iron chloride, the iron chloride being selectively condensed from the titanium tetrachloride vapor. Equally, the invention may be applied to the "partial" chlorination, or beneficiation, of an oxidic iron-containing titaniferous material by means of an iron chloride selective chlorination process provided that the quantity of iron chloride in the effluent gas is controlled as taught herein. Other iron-containing metalliferous materials to which the present invention is also applicable are, for example, bauxite, chromite, wolframite, scheelite, tantalite or columbite.

The fluidized bed chlorination of iron-containing metalliferous oxidic materials may be conducted to minimize the blow-over of bed solids. European Patent Specification No. 0034434, for example, where iron chloride in a fluidized bed effluent is contacted with oxygen in order to conduct a partial oxidation reaction in the top of a tall chlorination reactor containing the fluidized bed in the lower portion of the reactor discloses that the oxygen is introduced at such a point above the bed surface that carbon entrained in the effluent, or a portion if it has first become disentrained by virtue of a relatively low upward gas velocity, the disentrained carbon thereby being prevented from reacting with the oxygen. That patent teaches the use of a reduced cross-section in the reactor, to ensure the entrainment of solids formed, but only above the point of disentrainment of blow-over bed solids. Despite these precautions, of course, there will always be a loss of carbon due to the blow-over of the finer particles. In the process of U.S. Pat. No. 4094954, referred to above, for example, such particles would be lost with by-product solids removed by means of a cyclone.

According to the present invention it is not necessary to go to the expense of a modified reactor design as taught in European Patent Specification No. 0034434, nor in other way to take precautions to reduce the quantity of blow-over carbon, although processes whch embody such precautions are not excluded from the invention. What is relevant to the practice of the invention is that the quantity of blow-over carbon is known and the quantity of iron chloride formed is adjusted relative to it, for example by selecting the composition of the particular iron-containing metalliferous material. The quantity of blow-over carbon and of iron chloride in the gaseous effluent from the fluidized bed is readily determined by sampling and basic analytical techniques applied either to the gaseous effluent or to the iron chloride condensate recovered from it.

It is preferred that the content of carbon in the iron chloride condensate is greater than 7.5% by weight although it is, particularly preferably, at least 8.5% by weight. The concentration of the chlorine evolved is dependent on the quantity of carbon oxides produced by the combustion of the carbon. Preferably, therefore, the quantity of carbon is controlled to avoid any unacceptable dilution of the chlorine evolved and/or the quantity of chlorides are controlled to the same purpose. It is generally preferred that the quantity of carbon in the condensed iron chloride product is less than 20% by weight; particularly preferably less than 15% by weight and very suitably not more than 12.5% by weight.

The condensed iron chloride product will usually contain chlorides of minor constituents of the material chlorinated or even a proportion of other major constitutents thereof, some of which, such as chlorides of titanium, zirconium, chromium, niobium, vanadium, tungsten are oxidizable with the iron chloride and therefore represent recoverable chlorine, and others of which, for example chlorides of calcium and manganese are not oxidizable under these conditions. Analysis of the condensate readily reveals the content of oxidizable and non-oxidizable chlorides and, therefore, the quantity of oxygen required to react with the oxidizable chlorides and to combust the carbon. An undue excess of oxygen acts to dilute the chlorine produced. If acceptable from the dilution standpoint a mixture of oxygen and air may be used to conduct the oxidation. The dilution of the oxygen may reduce the efficiency of the oxidation so that a greater excess of oxygen may be necessary when an oxygen/air mixture is used. Preferably the excess of oxygen, with reference to pure oxygen or oxygen/air mixtures not containing substantially more than 50% of air, is from 5% to 75%, particularly preferably from 5% to 50% with reference to the quantity required to combust the carbon and to react with the oxidizable chlorides.

The present invention is preferably put into practice by introducing the condensed iron chloride, containing blow-over solids, into a bed, suitably a fluidized bed, of particles of an inert material into which bed oxygen-containing gas is introduced. The inert material may suitably be particulate iron oxide although other inert material, such as silica or spent chlorinator bed, may be used. It has been found to be particularly advantageous to utilize more than one input stream of oxygen or oxygen-containing gas. Preferably a first stream is introduced as the fluidizing gas in a suitable quantity to react with the carbon content of the feed to the bed and to maintain the bed temperature. This stream may also be used if desired to preheat the bed by the combustion of an initial charge of carbon. The bed is preferably preheated to a temperature of at least 500° C. and temperatures of up to 1000° C., or even higher, for example up to at least 1050° C. may suitably be maintained in the course of the process. Preferably the temperature is maintained at at least 550° C. particularly preferably at, at least, 600° C. It has been found that it is not necessary to preheat this first stream. Preferably a second stream of oxygen or oxygen-containing gas, or more than one such further stream, is introduced above the bed surface and into contact with the revaporized iron chloride. If a large excess of oxygen over that theoretically required is used at this point in the process it may be considered desirable to preheat the second and/or further streams of oxygen-containing gas to some extent although this is not necessary in all cases. The preferred excess of oxygen indicated above relate to the total quantity of oxygen used and may be split between the various streams of oxygen or oxygen-containing gas used. Preferably, however, not more than a 25% excess, and particularly preferably not more than a 15% excess, of oxygen over that required to attain the desired temperature is used in the first stream.

As a result of the reaction between the revolatilized iron chloride and the oxygen the gases leaving the oxidation zone contain iron oxide particles which may be recovered after any suitable temperature adjustment by usual means such as, for example, a cyclone. Such recovered iron oxide may contain a proportion of unoxidized iron chloride and is therefore preferably recycled to the bed from which a corresponding proportion of the inert solids is preferably purged.

While the quantity of carbon blow-over can be varied within limits, these limits are somewhat narrow under acceptable fluidized bed chlorination conditions. The iron oxide content of the material being chlorinated, however, may be varied by blending different grades of the material. If the flow of chlorine is sufficient the proportion of iron chloride and other oxidizable chlorides in the condensate recovered from the chlorination effluent will vary proportionally to the proportion of the oxides in the material. Thus it is possible to control the ratio of blow-over carbon to iron chloride (and other chlorides and materials) in the chlorination effluent. A suitable such ratio is preferably from 1:3 to 1:14 particularly preferably from 1:4 to 1:12.

The present invention is advantageously applicable to the recovery of chlorine from iron chloride produced in the course of the chlorination of iron-containing titaniferous oxidic materials and requires a modification of normal practice in the chlorination of such materials. The chlorination of iron-containing titaniferous oxidic materials has tended to fall into two categories which are the "total" chlorination of materials, such as rutile or synthetic rutile, containing greater than about 85% by weight of titanium oxide and less than about 5% by weight of iron oxide and the "partial" chlorination or beneficiation of materials, such as ilmenite, containing generally less than about 50% by weight of titanium oxide and up to about 60% of iron oxide. In the latter category the product beneficiate containing not more than about 5% by weight of iron oxide has usually been used as a raw material for a 'total' chlorination process. Neither process produces an iron chloride condensate suitable for the application of the present invention since, in the context of a carbon blow-over, from reactions not specifically designed to reduce this, of about 0.075 to 0.125 parts per part by weight of titanium dioxide chlorinated, the first category produces an iron chloride condensate containing relatively too little iron chloride so that the application of the invention would result in an unduly high dilution of the chlorine evolved by carbon combustion products, and the second category produces an iron chloride condensate containing relatively too little carbon so that expensive additional carbon would have to be added in a substantial quantity.

According to the present invention, as applied to the chlorination of iron-containing titaniferous oxidic materials, the iron oxide content of the material may suitably be from greater than about 10% to 35%, preferably from about 12% to 30% and particularly preferably from about 15% to 30% by weight of the material. The content of titanium dioxide in the material may suitably be from about 70% to 85% by weight of the material. A suitable material containing such proportions of constituents is not readily available and, in consequence, the invention is suitably put into effect by chlorinating blends of materials giving such proportions. Preferably such a blend is of ilmenite with either, rutile or a mixture of rutile and slag. A suitable slag is produced by the Richards Bay Company and contains typically above about 85% by weight of titanium dioxide and about 10% of iron oxide although titanium dioxide-rich slags containing up to about 96% of titanium dioxide and down to about 2% of iron oxide may be used if obtainable. Sources of rutile and ilmenite ores or sands are well known to those in the art.

One suitable range of blends of rutile, slag and ilmenite for use according to this invention is as follows.

Rutile: For example Australian Rutile and/or Sierra Rutile in respective proportions for example of 20-30 parts to 5-15 parts. Iron oxide content about 0.5-3%. Titanium oxide content about 95%-98%.

Ilmenite: For example Australian Ilmenite.

Slag: Richards Bay Slag for example having an iron oxide about 5-15% and a titanium oxide about 80-90%.

Proportions on a TiO$_2$ basis:

(a) Rutile:Slag=70 to 55:30 to 45, preferably=68 to 58:32 to 42, for example=63:37,
(b) Rutile+Slag: Ilmenite=50 to 60:50 to 40, preferably=52 to 57:48 to 43, for example=55:45, The particular sources of ores as stated above is not critical. The ranges given above contemplate the use of an ilmenite containing about 50% to 55% titanium dioxide and about 45% to 40% iron oxides. If an ilmenite containing markedly more iron oxides is used the proportions may have to be altered accordingly if it is required to obtain an iron chloride-containing condensate containing the proportions of oxidizable chlorides to carbon indicated above as preferred, in view of wide variation in the content of iron oxides found in ilmenite.

Referring now to the drawings wherein like numerals indicate like parts, shown in FIG. 1 is a unit operations flow sheet indicating several unit operational steps in accordance with the process of this invention.

The first unit 10 is a blending unit for blending of oxidic materials or ores along with coke or other carbon and shown in the drawing to comprise a blend of ilmenite and rutile ore along with coke. The blended ores and coke are withdrawn from the blending unit 10 by an ore stream 12 which is combined with a chlorine stream 14 to provide a raw material feed stream 16 to the bottom or base 22 of a fluidized chlorinator unit 20.

The fluidized bed chlorinator unit 20 is adapted to admit fluidizing gas along with the raw material feed stream 16 at the base 22 and to withdraw overhead gaseous products stream 24 from the top 26 of the unit 20. The fluidizing gas stream 16 includes means 23 for introducing at a controlled ratio of blended ore and coke in the fluidizing gases entering through the base 22 of the unit 20. The chlorinator unit 20 further contains a discharge stream 28 from the bottom 22 for withdrawing bed without interrupting the flow of fluidizing gases. Means can be provided for measuring the temperature of the bed and for measuring the fluid bed pressure drop.

The chlorinator unit 20 can be a partial chlorinator unit or a total chlorinator unit. In the event the chlorinator unit 20 is a partial chlorinator, the flow of gases in feed 16 to unit 20 comprises chlorine diluted to about 30% to 50% by volume with gases inert to the chlorination reaction taking place within the chlorinator unit 20. Bed materials beneficiated which, in substance, is less reactive to chlorine than iron oxide can be removed from time to time via the bed removal discharge stream 28 at the base 22 of the chlorinator unit 20. In the event the chlorinator unit 20 is a total chlorinator, the flow of gases in the feed stream 16 comprises substantially neat chlorine gas although the chlorine can be diluted somewhat with gases inert to the chlorination reaction. Accordingly, the chlorination unit 20 produces a flow of iron trichloride from the blend of ores by partial or total chlorination of the blend of ores. Impurities present in the ores as well as blow-over particles of ore and coke are contained in the overhead stream 24.

In either chlorination process, overhead gaseous products 24 are withdrawn through the top 26 of the chlorinator unit 20 and passed through a horizontal cooling duct 30 containing rodding points to a cold cyclone 40. Chlorides more volatile than iron trichloride remain in the gaseous phase and can pass out of the vortex finder of the cold cyclone 40 which can be recovered by subsequent use or passed to an overhead scrubber for disposal. A cyclone discharge stream 44 from the cyclone 40 contains iron trichloride and blow-over carbon which is discharged through a solids removal valve 46 such as a pocket valve, a star valve, or similar mechanically driven continuous valve. The discharge stream 44 passes into a vertical feed tube 48 which passes the discharged iron trichloride and blow-over carbon into a chlorine regenerator unit 50.

The chlorine regenerator unit 50 is adapted to admit fluidizing gas 52 at the base 54 of the unit 50 and to withdraw an overhead gaseous products stream 56 from the top portion of the unit 50. The overhead gaseous stream 56 passes through a horizontal cooling tube 68 containing rodding points to a second cold cyclone 70 adapted to discharge solids 72 and overhead gases 74 from the vortex finder to a scrubber for disposal. The base 54 of the chlorine regenerator unit 50 is provided with a discharge means 58 for withdrawing bed without interrupting the flow of fluidizing gases. The base 54 of the regenerator unit 50 supports a reduced diameter nickel alloy insert 60 mounted vertically within the unit 50 to form a reduced diameter fuid bed within the regenerator unit 50 and thus restrict the flow rate of gases needed to fluidized the bed. Means can be provided to measure the temperature of the bed and the fluid bed pressure drops. In practice, the annular space between the insert 60 and the interior walls of the regenerator unit 50 is allowed to fill with unfluidized bed material. The pressure drop data provides data on the bed height to accomplish this initially and to allow the bed to be run at the top of the insert 60. The vertical feed tube 48 terminates just above the fluidized bed insert 60. Oxygen gas can be fed by a feed pipe 62 to the regenerating unit 50, preferably by interconnecting to the vertical tube 48, just above the fluidized bed insert 60. Materials, fine sand, and coke, needed initially to form this bed and to replenish the bed withdrawn from the chlorine regenerator 50 can be added from a hopper 65 adapted to feed into the cyclone 40 and descend through the vertical feed tube 48 to the regenerator fluid bed.

The process of this invention is based on the fluidized bed chlorination of an iron-containing metalliferous oxidic material with a chlorine containing gas in the presence of excess carbon at fluidized bed temperatures above 500° C. The metalliferous oxide materials ordinarily comprise a blend of two or more metal oxide containing ores to provide between 10% and 35% iron oxide content by weight of the oxide material blend. In the chlorination step, at least a portion of the iron values in the oxide matrial blend are chlorinated while the heat combusts at least a portion of the carbon to produce an effluent stream containing vaporous iron chloride and a quantity of blow-over carbon along with combustion gases. The vaporous iron chloride is condensed and removed from the effluent stream along with blow-over carbon particles to provide a residue wherein the quantity of condensed iron chloride is controlled relative to the quantity of blow-over carbon. In this regard, the relative quantities of condensed iron chloride and blow-over carbon are controlled by controlling the iron oxide content between 10% and 35% in the starting blend of metal oxide containing ores. Thus, the iron oxide content in the starting blend of oxide material is controlled to produce certain quantities of iron chloride and blow-over carbon as residues from the chlorination step.

In accordance with this invention, the residues from the chlorination step contain a quantity of blow-over carbon in combination with a quantity of condensed iron chloride in a weight ratio of 1 to 3 parts of blow-over carbon to 1 to 14 parts of condensed iron chloride (including minor amounts of other oxidizable metal chlorides). On a weight-basis, the content of blow-over carbon in the iron chloride condensate is between 7.5% and 20% blow-over carbon based on the weight of blow-over carbon plus iron chloride.

The quantity of condensed iron chloride along with the given quantity of blowover carbon is then reheated in a recycle combustion step (regeneration) to an elevated temperature above 500° C. whereby the carbon and iron chloride react with excess oxygen to produce chlorine gas, carbon monoxide or dioxide gas, and iron oxide solids. The gaseous stream contains between 30% and 50% by volume chlorine gas and can be recycled to the initial chlorination step in the process. The excess oxygen in the recycle combustion step preferably is between 5% and 75% beyond the equivalents required to combust the carbon and react with the oxidizable chlorides. In this regard, the quantity of blow-over carbon combines with the oxygen content of the iron and other metal oxides to provide reaction heat in the recycle combustion step. The condensed iron chloride containing blow-over carbon can be heated in the recycled combustion step in a fluidized bed of inert materials into which the oxygen containing gas is introduced. The fluidized bed can be preheated to above 500° C. up to about 1050° C. for the recycle combustion step and regeneration of chlorine.

Accordingly, the quantity of iron-chloride is controlled relative to the quantity of blow-over carbon whereby the quantity of blow-over carbon in the recycle combustion step is sufficient to provide the required heat in the recycle combustion step and yet avoid undue dilution of chlorine evolved from the recycle combustion step. The concentration between 30% and 50% by volume chlorine can be directly recycled to the initial fluidized bed chlorination step. In accordance with the process of this invention, no additional source of heat is required in recycle combustion step for regenerating chlorine from the condensed iron chloride.

EXAMPLE 1

An experimental fluidized bed chlorinator unit was constructed using a silica tube 200 mm internal diameter and 3.6 m long, mounting this vertically in a gas fired furnace and providing it with means to admit fluidizing gas at the base and to withdraw gaseous products from the top along a horizontal cooling duct provided with rodding points to a cold cyclone, with provision to discharge solids from the cylone base and gases from its vortex finder to a scrubber for disposal. The base of the tube was also provided with means for withdrawing bed without interrupting the flow of fluidizing gases and with means for measuring the temperature of the bed. The fluid bed pressure drop could be measured.

The fluidizing gas flow entering the base of the unit was provided with a means for introducing, at a controlled rate, mixed ore and coke conveyed in the said fluidizing gases.

The unit thus described forms a means for producing a flow of freshly made iron trichloride from ores by the total or partial chlorination of these ores, the salt being accompanied by impurities present in the ores and by blowover particles of ore and coke.

In the event that the chlorinator is acting as a total chlorinator the flow of gases to its base is substantially neat chlorine gas although lower concentrations can also be used, and the chlorides more volatile than iron trichloride which remain in the gaseous phase, which pass out of the vortex finder of the cold cyclone, and which in full scale plant are recovered for use, are here led away to the scrubber for disposal.

In the event that the chlorinator is acting as a partial chlorinator the flow of gases to its base is chlorine diluted to 30-50% with gases inert to the reaction taking place, and bed material beneficiated in substances less reactive to chlorine than iron oxide is removed from time to time via the bed removal means at the base of the unit. The gases exiting the cold cyclone in this instance are substantially inert but contain small traces of chlorine slipping past the fluid bed which are removed in the scrubber.

The stream containing iron trichloride falls from the base of the cold cyclone via its solids removal valve being a pocket valve, star valve, or similar mechanically driven continuous valve, and into a vertical feed tube 75 mm i.d. which passes the material into a chlorine regenerator now described.

The experimental chloride regenerator unit was constructed using a high nickel alloy (Nimonic or Inconel) tube 180 mm internal diameter 2.4 m long mounting this vertically in a gas fired furnace and providing it with means to admit fluidizing gas at the base, and to withdraw gaseous products from the top along a horizontal cooling tube provided with rodding points to a cold cyclone, with provision to discharge solids from the cyclone base and gases from its vortex finder to a scrubber for disposal. The base of the tube was provided with means for withdrawing bed without interrupting the flow of fluidizing gases and with means for measuring the temperature of the bed.

The base of the unit was provided with an insert also of high nickel alloy, 125 mm internal diameter and 450 mm in length mounted vertically so as to form a fluid bed of this diameter within the unit thus restricting the volume flow rate of gases needed to fluidize the bed.

The vertical feed tube 75 mm i.d. terminated 100 mm above this insert, and oxygen gas was admitted to the nickel alloy tube 1100 mm above the insert.

The fluid bed pressure drop could be measured.

In practice, the annular space between the insert and the reactor vessel was allowed to fill with bed material, unfluidized, the pressure drop data providing data on the bed height to accomplish this initially and to allow the bed to be run at the top of the insert thenceforward.

Materials, fine sand and coke, needed to initially form this bed and to replenish the bed withdrawn from the base of the unit were added from a hopper into the chlorinator cold cyclone whence they descended via the mechanical valve and feed tube to the regenerator fluid bed.

The materials used in the experimental runs are described with respect to titaniferous ores but it is to be remembered that the invention also applies to other ores e.g. aluminiferous ores.

Ilmenite—55% $TiO_2$ West Australian ilmenite having a particle size distribution spreading from 90 microns to 220 microns or similar, with weight mean size 170 microns or similar.

Slag—85% $TiO_2$ S. African slag of a particle size range of 100 microns to 500 microns or similar, weight mean size 230 microns or similar.

Petroleum Coke A—Substantially pure carbon, c.99%, and a typical particle size 90 microns to 2000 microns, being ground coke, and containing approx. 10% w/w material finer than 200 microns.

Petroleum Coke B—Substantially pure carbon, c.99%, and of typical particle size 100 microns to 3500 microns, being ground coke, and containing approx. 4% material liner than 200 microns. A and B purchasable from Conoco or PMC.

Petroleum Coke C—Substantially pure carbon, c.99%, and of typical particle size 500 microns to 4000 microns, being ground coke, and with a weight mean size of 1500 microns. C purchasable from Great Lakes Carbon.

An experimental run will now be described which itself does not fall within the invention.

RUN 1

A fluid bed of ilmenite and coke B was previously chlorinated and this bed was used to form the starting bed in the chlorinator, being approx. 80% w/w ore sand and 20% w/w coke, being 1 meter deep. A selective chlorination was then carried out.

The bed was heated by means of the furnace to 950° C. whilst fluidized with nitrogen and then the gases were changed, being 60 l/min chlorine, 15 l/min air, and 70 l/min nitrogen, the air being adjusted so that the bed temperature ran at 950°-1000° C.; meanwhile feeding 3.2 kg of ilmenite along with 0.8 kg of coke B, evenly every 10 minutes.

Under these conditions c.2% chlorine slippage occurs and the iron chloride formed is iron trichloride. Slippage at 2% is controllable by altering the bed depth to suit using the pressure drop as an indicator and removing bed materials (beneficiated ilmenite and coke) at a greater or lower rate of removal to diminish or increase the bed depth, the Cl2 slippage being measured ex cyclone by means of a gas chromatograph. Iron trichloride etc. and blowover materials condense in the cooling duct and are recoverable in the cyclone, falling through the mechanical valve and down the feed tube.

A fluid bed of sand and the same coke was established in the chlorine regenerator also at 950°-1000° C. with the furnace temperature being at 950°-1000° C. and fluidized with 45 l/min of 02/N2 mixture, the proportions of which can be varied to give control of the fluid bed temperature. Oxygen was also added via the oxygen addition tube 1 m above the base of the feed tube in the regenerator, the quantity of this was controlled to give a Cl2/02 ratio of about 10/1 in the exit gas as measured by gas chromatograph. In this case typically 35% CL2 v/v in the product was found and 20 l/min of 02 was required. Under these conditions with a low 02/Cl2 ratio an excess of iron trichloride is present in the system condensing in the cyclone of the second unit and available for recycle to the unit in order to achieve substantially 100% conversion efficiency overall.

Running as above it is found that unless additional coke is added to the fluid bed of the second unit, eventually it is found to be impossible to control the temperature within the second unit, as insufficient carbon is coming forward from the first unit to sustain it.

Adding such coke, however, is a possible means of running the unit although not within the scope of the invention at present disclosed.

A further run will be described which does not fall within the scope of the invention.

RUN 2

In this, the material added to the first unit is 10 kg slag and 2.5 kg. coke B per 10 minutes, all other quantities being the same.

In this instance it is found that it is not possible to control the unit, as it is not possible to obtain a $Cl_2/O_2$ ratio of 10:1 with a $Cl_2$ concentration above 25% as a large excess of coke is coming forward from the first unit and with which the oxygen flows preferentially react, diluting the $Cl_2$ in the product gas and giving an unwanted rise in temperature in the second unit so as to put in jeopardy the life of the equipment.

RUN 3

A run will now be exemplified which is within the scope of the invention, which consists very simply of making a mixture of equal parts by weight of the ilmenite and the slag and feeding this to the unit at the rate of 4.8 kg mixed ore with 1.2 kg coke B fed evenly every 10 minutes.

In this instance, it is found possible to achieve 35% $Cl_2$ v/v with $Cl_2/O_2$ ratio of 10:1 without additional coke being added and with steady operating temperatures being obtained.

RUN 4

A further run is exemplified which is also within the scope of the invention which consists of feeding West Autralian ilmenite at 3.2 Kg every 10 minutes to the first rig as before, but, instead of also feeding 0.8 kg of coke B every 10 minutes, feeding a mixture of coke A and coke C so that while 0.8 kg of the mixture are fed every 10 minutes the proportions of the mixture are varied so that the run can be sustained without separately adding coke to the second unit. It is found that coke C is added only in minor amounts to effect a reduction in the coke blowing over from the first unit to the second unit and coke A which is a cheap and economical source of supply is used almost exclusively.

I claim:

1. In a process for recovering chlorine in a fluidized bed chlorination process for chlorinating iron-containing metalliferous oxidic materials where the fluidized bed chlorination step produces residues of iron chloride and blow-over carbon, the improvement comprising:

providing a blend of two or more iron-containing metalliferous oxidic materials selected from the ores of rutile, ilmenite, bauxite, chromite, wolframite, scheelite, tantalite, and columbite, wherein the blend of oxidic materials contains between 10% and 35% by weight iron oxide;

chlorinating the blend of metalliferous oxidic materials with recycled chlorine in the presence of excess carbon at temperatures between about 500° C. and 1050° C. to produce metal chlorides including iron chloride;

removing vaporous iron chloride and a quantity of blow-over carbon in an effluent stream from the chlorination step in a weight ratio of blow-over carbon to iron chloride of 1:3 to 1:14 where said weight ratio is controlled by the iron oxide content in said blend relative to said excess carbon;

condensing said vaporous iron chloride to form a condensed effluent stream;

regenerating chlorine from said condensed effluent stream by reacting said effluent stream containing condensed iron chloride and blow-over carbon with an oxygen containing gas containing excess oxygen beyond the quantity required (a) to combust the blow-over carbon and oxidize at least a portion of the iron chlorides to (b) maintain a reaction temperature from 500° C. to 1050° C., (c) to produce a recycle stream containing 30% to 50% chlorine gas and recycling said recycle stream to said blend chlorination step.

2. The process in claim 1 where the regeneration step is effected without the addition of carbon beyond the blow-over carbon.

3. The process in claim 1 where at least one of the blended metal oxide materials is a titaniferous material.

4. The process in claim 3 where the blended metal oxide materials comprise ilmenite and rutile ores.

5. The process in claim 3 where the blended metal oxide materials comprise ilmenite and a mixture of rutile ore and rutile slag.

6. The process in claim 1 where one of the blended metal oxide materials comprises bauxite.

7. The process in claim 1 where one of the blended metal oxide materials comprises chromite.

8. The process of claim 1 where one of the blended metal oxide materials comprises wolframite.

9. The process in claim 1 where one of the blended metal oxide materials comprises scheelite.

10. The process in claim 1 where one of the blended metal oxide materials comprises tantalite.

11. The process in claim 1 where one of the blended metal oxide materials comprises columbite.

12. The process in claim 1 where the blended oxide materials comprise at least one titaniferous oxide material.

13. The process in claim 12 where the titanium oxide content is between 70% and 85% by weight.

14. The process in claim 1 where the chlorination process is a total chlorination process.

15. The process in claim 1 where the chlorination process is a partial chlorination process.

16. The process in claim 1 where the condensed metal oxides comprise between 7.5% and 20% by weight based on the condensed metal oxides and the blow-over carbon.

17. The process in claim 1 wherein the excess oxygen in the regeneration step is between 5% and 50% excess required to combust the blow-over carbon.

18. In a fluidized bed process for the chlorination of oxidic materials containing iron metalliferous oxides wherein the chlorination process produces residues of iron chloride and blow-over bed solids containing a quantity of blow-over carbon, the improved process comprising:

providing a blend of oxide ores comprising oxidic materials the blend comprising titanium dioxide and between 10% and 35% by weight iron oxide;

chlorinating the blend of oxide ores in the presence of excess carbon at temperatures above 500° C.;

removing from the chlorination step an effluent stream comprising iron chloride and a quantity of blow-over carbon in the weight ratio of blow-over carbon to iron chloride of 1:3 to 1:14;

oxidizing the iron chloride including other oxidizable chlorides with a source of oxygen between 5% to 75% excess oxygen beyond the quantity required (a) to combust the carbon and oxidize the oxidizable chlorides, (b) to maintain a reaction temperature of from 500° C. to 1050° C. and (c) to produce a recycle stream containing 30 to 50% chlorine gas and;

recycling said step recycle stream to said blend chlorination step.

19. The process in claim 18 where at least a portion of the recovered chlorine is recycled to the process step of chlorinating the blend of oxide ores.

20. In a process for recovering chlorine in a fluidized bed chlorination process for chlorinating iron-containing metalliferous oxidic materials where the fluidized bed chlorination step produces residues of iron chloride and blow-over carbon, the improvement comprising:

providing a blend of iron-containing metal oxide materials including from 12% to 30% iron oxide and titanium dioxide, the content of titanium dioxide in said blend being in the range of from about 70% to about 85% of said blend;

chlorinating the blend of metal oxide materials in the presence of excess carbon at temperatures between 500° C. and 1050° C. to produce metal chlorides including vaporous iron chloride;

removing vaporous iron chloride and a quantity of blow-over carbon in an effluent stream from the chlorination step in a weight ratio of blow-over carbon to iron chloride of 1:3 to 1:14, where said weight ratio is controlled by the iron oxide content in said blend relative to said excess carbon;

regenerating chlorine from said effluent stream by reacting said effluent stream containing iron chloride and blow-over carbon with an oxygen containing gas containing excess oxygen beyond the quantity required (a) to combust the blow-over carbon (b) to oxidize the iron chlorides, (c) to maintain a reaction temperature of from 500° C. to 1050° C. to and to produce a gas stream containing 30 to 50% chlorine for recycling to the blend chlorination step.

* * * * *